United States Patent
Sorrentino et al.

(10) Patent No.: US 9,716,577 B2
(45) Date of Patent: *Jul. 25, 2017

(54) SIGNALING OF SEQUENCE GENERATOR INITIALIZATION PARAMETERS FOR UPLINK REFERENCE SIGNAL GENERATION

(71) Applicant: Telefonaktiebolaget L M Ericsson (publ), Stockholm (SE)

(72) Inventors: Stefano Sorrentino, Solna (SE); Fredrik Lindqvist, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,569

(22) Filed: Jan. 26, 2016

(65) Prior Publication Data
US 2016/0156444 A1 Jun. 2, 2016

Related U.S. Application Data

(60) Continuation of application No. 14/244,332, filed on Apr. 3, 2014, now Pat. No. 9,253,005, which is a
(Continued)

(51) Int. Cl.
*H04L 27/26* (2006.01)
*H04W 72/00* (2009.01)
(Continued)

(52) U.S. Cl.
CPC ......... *H04L 5/0051* (2013.01); *H04B 1/0475* (2013.01); *H04B 1/7143* (2013.01);
(Continued)

(58) Field of Classification Search
CPC ... H04L 5/0048; H04L 5/0053; H04L 5/0091; H04L 27/2613; H04L 25/03343;
(Continued)

(56) References Cited

U.S. PATENT DOCUMENTS 6,320,897 B1 11/2001 Fattouche et al.
8,731,124 B2 * 5/2014 Sorrentino .......... H04L 27/2613
370/310
(Continued)

FOREIGN PATENT DOCUMENTS

CN 101036115 A 9/2007
CN 101547040 A 9/2009
(Continued)

OTHER PUBLICATIONS

Panasonic, "UE-specific base sequence assignment for UL CoMP", 3GPP TSG RAN WG1 Meeting #68, Feb. 6-10, 2012, Dresden, Germany, R1-120229, pp. 1-5.*
(Continued)

*Primary Examiner* — Michelle M Koeth
(74) *Attorney, Agent, or Firm* — Coats & Bennett, PLLC

(57) ABSTRACT

A base station initializes pseudo-random sequence generators on which wireless devices base generation of uplink reference signals. The base station determines a first sequence from a first subset of possible initialization sequences for a sequence generator of a first device, and determines a second sequence from a second subset of possible initialization sequences for a sequence generator of a second device. The range of this second subset spans at least the range of the first subset. The base station further encodes the first sequence as a first set of two or more parameters, and encodes the second sequence as a second set of one or more parameters. This second set includes at least one parameter not included in the first set, and comprises fewer bits than the first set. The base station initializes the sequence generators by transmitting the first and second sets of parameters to the devices.

28 Claims, 9 Drawing Sheets

Related U.S. Application Data division of application No. 13/468,855, filed on May 10, 2012, now Pat. No. 8,731,124.

(60) Provisional application No. 61/616,866, filed on Mar. 28, 2012.

(51) Int. Cl.
  *H04L 5/00* (2006.01)
  *H04W 72/04* (2009.01)
  *H04B 1/7143* (2011.01)
  *H04B 1/04* (2006.01)
  *H04L 1/00* (2006.01)
  *H04L 25/03* (2006.01)

(52) U.S. Cl.
  CPC ........ *H04L 5/0048* (2013.01); *H04L 27/2613* (2013.01); *H04W 72/0413* (2013.01); *H04W 72/0466* (2013.01); *H04L 1/0029* (2013.01); *H04L 25/03343* (2013.01)

(58) Field of Classification Search
  CPC ............... H04L 1/0029; H04L 5/0051; H04W 72/0466; H04W 72/0413; H04B 1/7143; H04B 1/0475
  See application file for complete search history.

(56) References Cited

U.S. PATENT DOCUMENTS

| | | | |
|---|---|---|---|
| 9,118,369 B2 * | 8/2015 | Sorrentino | .......... H04L 27/2613 |
| 9,253,005 B2 * | 2/2016 | Sorrentino | .......... H04L 27/2613 |
| 2009/0154700 A1 | 6/2009 | Sibert et al. | |
| 2009/0249027 A1 | 10/2009 | Kim et al. | |
| 2010/0135493 A1 | 6/2010 | Yoon et al. | |
| 2011/0002412 A1 | 1/2011 | Hou et al. | |
| 2012/0176884 A1 | 7/2012 | Zhang et al. | |
| 2013/0034064 A1 | 2/2013 | Nam et al. | |
| 2013/0039387 A1 * | 2/2013 | Qu | ........................ H04L 5/0051 |
| | | | 375/141 |
| 2013/0072241 A1 | 3/2013 | Sorrentino | |
| 2013/0121266 A1 | 5/2013 | Ko et al. | |
| 2014/0071936 A1 * | 3/2014 | Zhang | ................. H04L 25/0226 |
| | | | 370/330 |

FOREIGN PATENT DOCUMENTS

| | | |
|---|---|---|
| CN | 102227888 A | 10/2011 |
| WO | 2011084004 A2 | 7/2011 |

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, pp. 1-101.

Ericsson et al., "Details about UL DMRS configuration and signaling", 3GPP TSG RAN WG1 Meeting #68bis, Mar. 26-30, 2012, Jeju, Korea, R1-121028, pp. 1-5.

Intel Corporation, "Remaining details of downlink DM-RS", 3GPP TSG RAN WG1 Meeting #68bis, Mar. 26-30, 2012, Jeju, Korea, R1-121520, pp. 1-3.

Apple, Inc., "Scrambling Sequences for Enhanced PDCCH", 3GPP TSG RAN WG1 Meeting #68, Feb. 6-10, 2012, Dresden, Germany, R1-120272, pp. 1-6.

Interdigital Communications, LLC, "DM-RS sequence for CoMP", 3GPP TSG RAN WG1 Meeting #68, Feb. 6-10, 2012, Dresden, Germany, R1-120134, pp. 1-3.

Renesas Mobile Europe Ltd., "Downlink DM-RS for Release 11", 3GPP TSG RAN WG1 Meeting #68, Feb. 6-10, 2012, Dresden, Germany, R1-120379, pp. 1-5.

Sharp, "DMRS configuration for UL CoMP", 3GPP TSG RAN WG1 Meeting #68bis, Mar. 26-30, 2012, Jeju, Korea, R1-121350, pp. 1-8.

Pantech, "UL DM-RS enhancements for Rel-11", 3GPP TSG RAN WG1 Meeting #68, Feb. 6-10, 2012, Dresden, Germany, R1-120324, pp. 1-7.

* cited by examiner

| $z$ | $c_{init}$ |
|---|---|
| 0,1,...,29 | 0,1,...,29 |
| 30,31,...,59 | 32,33,...,61 |
| 60,61,...,89 | 64,65,...,93 |
| 90,91,...,119 | 96,97,...,125 |
| 120,121,...,149 | 128,129,...157, |
| 150,151,...,179 | 160,161,...,189 |
| 180,181,...,209 | 192,193,...,221 |
| 210,211,...,239 | 224,225,..., 253 |
| 240,241,...,269 | 256,257,..., 285 |
| 270,271,...,299 | 288, 289, ...,317 |
| 300,301,...,329 | 320,321,..., 349 |
| 330,331,..., 359 | 352,353, ..., 381 |
| 360,361,..., 389 | 384,385,..., 413 |
| 390,391,..., 419 | 416,417,..., 445 |
| 420,421,..., 449 | 448,449,..., 477 |
| 450,451,..., 479 | 480,481,..., 509 |
| 480,481,...,509 | 512, 513,...,541 |

FIG. 5

|  | CSH_ENABLE |
|---|---|
| $z \in \{0,1,...,509\}$ | 1 |
| $z \notin \{0,1,...,509\}$ | 0 |

*FIG. 6A*

|  | CSH_ENABLE |
|---|---|
| $z \in \{0,1,...,509\}$ | 1 |
| $z = 511$ | 0 |

*FIG. 6B*

| $x$ | $y$ | $c_{init}$ |
|---|---|---|
| 0 | 0,1,...,29 | 0,1,...,29 |
| 1 | 0,1,...,29 | 32,33,...,61 |
| 2 | 0,1,...,29 | 64,65,...,93 |
| 3 | 0,1,...,29 | 96,97,...125 |
| 4 | 0,1,...,29 | 128,129,...157, |
| 5 | 0,1,...,29 | 160,161,...,189 |
| 6 | 0,1,...,29 | 192,193,...,221 |
| 7 | 0,1,...,29 | 224,225,..., 253 |
| 8 | 0,1,...,29 | 256,257,..., 285 |
| 9 | 0,1,...,29 | 288, 289, ...,317 |
| 10 | 0,1,...,29 | 320,321,..., 349 |
| 11 | 0,1,...,29 | 352,353, ..., 381 |
| 12 | 0,1,...,29 | 384,385,..., 413 |
| 13 | 0,1,...,29 | 416,417,..., 445 |
| 14 | 0,1,...,29 | 448,449,..., 477 |
| 15 | 0,1,...,29 | 480,481,..., 509 |
| 16 | 0,1,...,29 | 512, 513,...,541 |

*FIG. 8*

SIGNALING OF SEQUENCE GENERATOR INITIALIZATION PARAMETERS FOR UPLINK REFERENCE SIGNAL GENERATION

RELATED APPLICATIONS

The present application is a continuation of U.S. patent application Ser. No. 14/244,332 filed on Apr. 3, 2014, which application is a divisional of U.S. patent application Ser. No. 13/468,855, filed on May 10, 2012, now issued U.S. Pat. No. 8,731,124, which claims priority to U.S. Provisional Patent Application Ser. No. 61/616,866, filed Mar. 28, 2012, the entire contents of which are incorporated herein by reference.

TECHNICAL FIELD

The present invention generally relates to initialization of pseudo-random sequence generators on which wireless devices base generation of uplink reference signals, and more particularly relates to advantageous techniques for encoding and signaling parameters for such initialization.

BACKGROUND

A wireless device (also referred to as a user equipment, UE) transmits one or more uplink reference signals in a wireless communication system for any number of reasons, such as to permit the receiving base station to estimate the wireless channel. The wireless device typically generates a reference signal using one or more pseudo-random sequence generators. Accordingly, initialization of the sequence generator(s) with particular initialization sequence(s) dictates the uplink reference signal that the device transmits. The base station governs the initialization of the device's sequence generator(s) in this regard, meaning that signaling an initialization sequence to a wireless device presents challenges in terms of signaling overhead.

Consider, for instance, Long Term Evolution (LTE) networks. LTE networks are designed with the aim of enabling optional CoMP (Coordinated multipoint processing) techniques, where different sectors and/or cells operate in a coordinated way in terms of, e.g., scheduling and/or processing. An example is uplink (UL) CoMP where the signal originating from a single UE is typically received at multiple reception points and jointly processed in order to improve the link quality. UL joint processing (also referred to as UL CoMP) allows transformation of what is regarded as inter-cell interference in a traditional deployment into a useful signal. Therefore, LTE networks taking advantage of UL CoMP may be deployed with a smaller cell size compared to traditional deployments, in order to fully take advantage of the CoMP gains.

The LTE UL is designed assuming coherent processing, i.e., the receiver is assumed to be able to estimate the radio channel from the transmitting UE and to take advantage of such information in the detection phase. Therefore, each transmitting UE sends a reference signal (RS) associated with each UL data or control channel (e.g., PUSCH and PUCCH). 3GPP TS 36.211 V10.4.0 (2011-12), "Technical Specification Group Radio Access Network; Evolved Universal Terrestrial Radio Access (E-UTRA); Physical Channels and Modulation (Release 10)." In case of PUSCH, one demodulation reference signal (DMRS) per slot is transmitted on the same bandwidth as the uplink data channel. In case of PUCCH, multiple PUCCH-RSs are transmitted and time multiplexed by the UE within each subframe, spanning the PUCCH bandwidth assigned to the UE.

Additional RSs possibly transmitted by UEs consist of sounding reference signals (SRS). These reference signals are transmitted by a UE at predetermined time instances and over a predetermined bandwidth, in order to enable estimation of the UL channel properties at the network side.

RSs from different UEs within the same cell potentially interfere with each other and, assuming synchronized networks, even with RS originated by UEs in neighboring cells. In order to limit the level of interference between RSs, different techniques have been introduced in different LTE releases in order to allow orthogonal or semi-orthogonal RSs. The design principle of LTE assumes orthogonal RS within each cell and semi-orthogonal RS among different cells (even though orthogonal RSs can be achieved for aggregates of cells by so called "sequence planning"). However, orthogonality of DMRS transmitted by UEs belonging to different cell is currently under discussion in Rel-11 LTE standardization. A family of techniques for inter-cell DMRS orthogonality has been discussed. Some of these techniques rely on the possibility of coordinating the base-sequence index (BSI) employed for RS generation by different UEs in different cells, as described more fully later.

Another application in the UL of LTE is multi-user, multiple-input multiple-output (MU-MIMO), where data transmissions on PUSCH from multiple UEs are coscheduled on at least partly overlapping bandwidth in the same subframe, within the same cell. The UEs are separated at the receiver side by exploiting multiantenna processing. In order to allow the receiver to resolve the signals from the coscheduled UEs, it is beneficial to assign the DMRS in an orthogonal fashion for such UEs. This may be achieved by assigning different orthogonal cover codes (OCCs) to the DMRS of the coscheduled UEs. If the coscheduled bandwidths are fully overlapping, cyclic shift (CS) separation of the DMRS for the different UEs may also be exploited.

Each DMRS is characterized by a group-index and a sequence-index, which define the so called base-sequence index (BSI). BSIs are assigned in a cell-specific fashion in Rel-8/9/10 and they are a function of the cell-ID, where a cell-ID characterizes a cell in LTE and affects several cell-specific algorithms and procedures. Different base sequences are semi-orthogonal, which implies that some inter-sequence interference is present in the general case. The DMRS for a given UE is only transmitted on the same bandwidth of PUSCH and the base sequence is correspondingly generated so that the RS signal is a function of the PUSCH bandwidth. For each subframe, 2 RSs are transmitted, one per slot. In Rel-11 it is likely that UE-specific assignment of BSIs will be introduced.

Orthogonal DMRS can be achieved by use of cyclic shift (CS) in Rel-8/9 or by CS in conjunction with orthogonal OCC in Rel-10. CS is a method to achieve orthogonality based on cyclic time shifts, under certain propagation conditions, among RS generated from the same base sequence. Only 8 different CS values can be dynamically indexed in Rel-8/9/10, even though in practice less than 8 orthogonal DMRS can be achieved depending on channel propagation properties (without considering OCC in this example). Even though CS is effective in multiplexing DMRSs assigned to fully overlapping bandwidths, orthogonality is lost when the bandwidths differ and/or when the interfering UE employs another base sequence.

In order to increase interference randomization between different UEs (e.g., at different cells), a pseudo-random offset to the CS values is applied (CS hopping, CSH). The randomization pattern is cell-specific in Rel-8/9/10. A different CS offset is in general applied in each slot and it is known at both UE and eNB sides, so that it can be compensated at the receiver side during channel estimation. A CSH is generated according to a sequence initialization parameter $c_{init}$ having 31 bits.

OCC is a multiplexing technique based on orthogonal time domain codes, operating on the 2 RS provided for each UL subframe. The OCC code [1 −1] is able to suppress an interfering DMRS as long as its contribution after the matched filter at the receiver is identical on both DMRSs of the same subframe. Similarly, the OCC code [1 1] is able to suppress an interfering DMRS as long as its contribution after the eNB matched filter has opposite sign respectively on the two RSs of the same subframe. It is straightforward to assume that CS and OCC will be supported also by Rel-11 UEs.

While base-sequences are assigned in a semi-static fashion, CS and OCC are dynamically assigned as part of the scheduling grant for each UL PUSCH transmission. Even though joint processing techniques may be applied for PUSCH, channel estimates based on DMRS are typically performed in an independent fashion at each reception point, even in case of UL CoMP. Therefore, it is crucial to keep the interference level at an acceptably low level, especially for RSs.

In case of SRS, the RSs are also generated according to a BSI (which may differ from the DMRS BSI for some UEs). Different SRS may be multiplexed by use of CS and COMBs. A COMB indicates a specific interleaved mapping of the RS to a subset of subcarriers. SRS assigned to different COMBS (i.e., non overlapping sets of subcarriers) are thus ideally orthogonal.

In case of PUCCH-RS, one or more RS per slot are generated, depending on the PUCCH format and other parameters. PUCCH-RS for different UEs are separated by use of CS and OCC, which spans over each slot. Also PUCCH-RS are generated according to a BSI that may in general differ from the DMRS BSI.

One of the improvements being discussed in LTE Rel-11 consists of the possibility of configuring the parameters for BSI and CSH initialization in a UE specific fashion, either semi-statically or dynamically, e.g., by signaling in the scheduling grants. Such configurability allows additional RS allocations options enabling, e.g., inter-cell orthogonality between UEs. R1-121028—"Details about UL DMRS configuration and signaling." In order to achieve orthogonality by OCC, it is necessary to configure the paired UEs with the same CSH pattern. Problematically, however, the CSH initialization $c_{init}$ is a 31 bit parameter, requiring significant overhead for being signaled.

SUMMARY

One or more embodiments herein advantageously reduce control signaling between a base station and a wireless device in a wireless communication system, as compared to known control signaling approaches. The embodiments in particular reduce the control signaling for initializing pseudo-random sequence generators on which wireless devices base generation of uplink reference signals.

More particularly, one or more embodiments include a base station configured to initialize pseudo-random sequence generators on which wireless devices base generation of uplink reference signals. The base station is configured to determine a first sequence from a first subset of possible initialization sequences for a pseudo-random sequence generator of a first wireless device, and to determine a second sequence from a second subset of possible initialization sequences for a pseudo-random sequence generator of a second wireless device. The range of this second subset spans at least the range of the first subset.

The base station further encodes the first sequence as a first set of two or more parameters, and encodes the second sequence as a second set of one or more parameters. This second set of parameters includes at least one parameter not included in the first set of parameters, and comprises fewer bits than the first set. Having performed this encoding, processing the base station initializes the sequence generators of the first and second devices with the first and second sequences by transmitting the first and second sets of parameters to the first and second devices. Upon receiving the sets of parameters, the devices decode the sequences according to one or more rules that define the sequences as a function of those sets of parameters and then generate the uplink reference signals based on those sequences.

In at least some embodiments, the base station encodes the second sequence as a single parameter. In one embodiment, for example, this single parameter comprises a defined number of least significant bits from the second sequence corresponding to the range of the second subset. In another embodiment, by contrast, the second sequence is encoded based on a defined one-to-one mapping of possible initialization sequences within the second subset to possible values for the single parameter, wherein the range of the single parameter is smaller than the range of the second subset.

In other embodiments, the base station encodes the second sequence as a linear combination of two parameters. In this case, a first one of the two parameters encodes a defined number of least significant bits from the second sequence, and a second one of the two parameters encodes a defined number of more significant bits from the second sequence (not including one or more most significant bits from the second sequence).

In any case, the second sequence is encoded as a second set of parameters that comprises only 9 or 10 bits in some embodiments, which is significantly fewer bits than the 31 bits required to signal the second sequence itself in those embodiments. The embodiments thereby prove to reduce control signaling associated with the signaling of the second sequence.

In one or more embodiments where the initialization sequences correspond to cyclic shift hopping patterns for the devices, the first initialization sequence comprises a cell-specific sequence and the second initialization sequence comprises a device-specific sequence. The base station initializes the sequence generators in this way in order to maintain backwards compatibility with respect to the first device, while achieving inter-cell orthogonality for the second device with respect to a third wireless device in a different cell. Where the embodiments employ LTE, for example, the first and third devices comprise legacy devices that are configured for LTE Rel-8/9/10, and the second device comprises a newer device that is configured for LTE Rel-11.

In this case, the base station determines the second sequence for the second device by selecting from the second subset the initialization sequence that matches the initialization sequence for a pseudo-random sequence generator of the third device. The base station is able to do this because the range of the second subset spans at least the range of the subset of possible initialization sequences for the third device; that is, the initialization sequence for the second device is able to take on values that are possible for the third device. With the initialization sequences (and therefore the cyclic shift hopping patterns) for the second and third devices the same, the base station is able to achieve inter-cell orthogonality for these paired devices through use of different orthogonal cover codes (OCCs) for the devices. Notably, therefore, by configuring the initialization sequences in this way, the base station is able to arbitrarily pair a newer device in one cell with any legacy device in a different cell for achieving inter-cell orthogonality between those devices' uplink reference signals.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a table that illustrates an example one-to-one mapping between the decimal representation of possible initialization sequences and possible values for a single parameter according to one or more embodiments.

FIGS. 6A-6B are tables that illustrate different examples of joint encoding according to one or more embodiments.

FIG. 8 is a table that illustrates an example one-to-one mapping between the decimal representation of possible initialization sequences and possible values for a set of parameters according to one or more embodiments.

DETAILED DESCRIPTION

Figure 1:
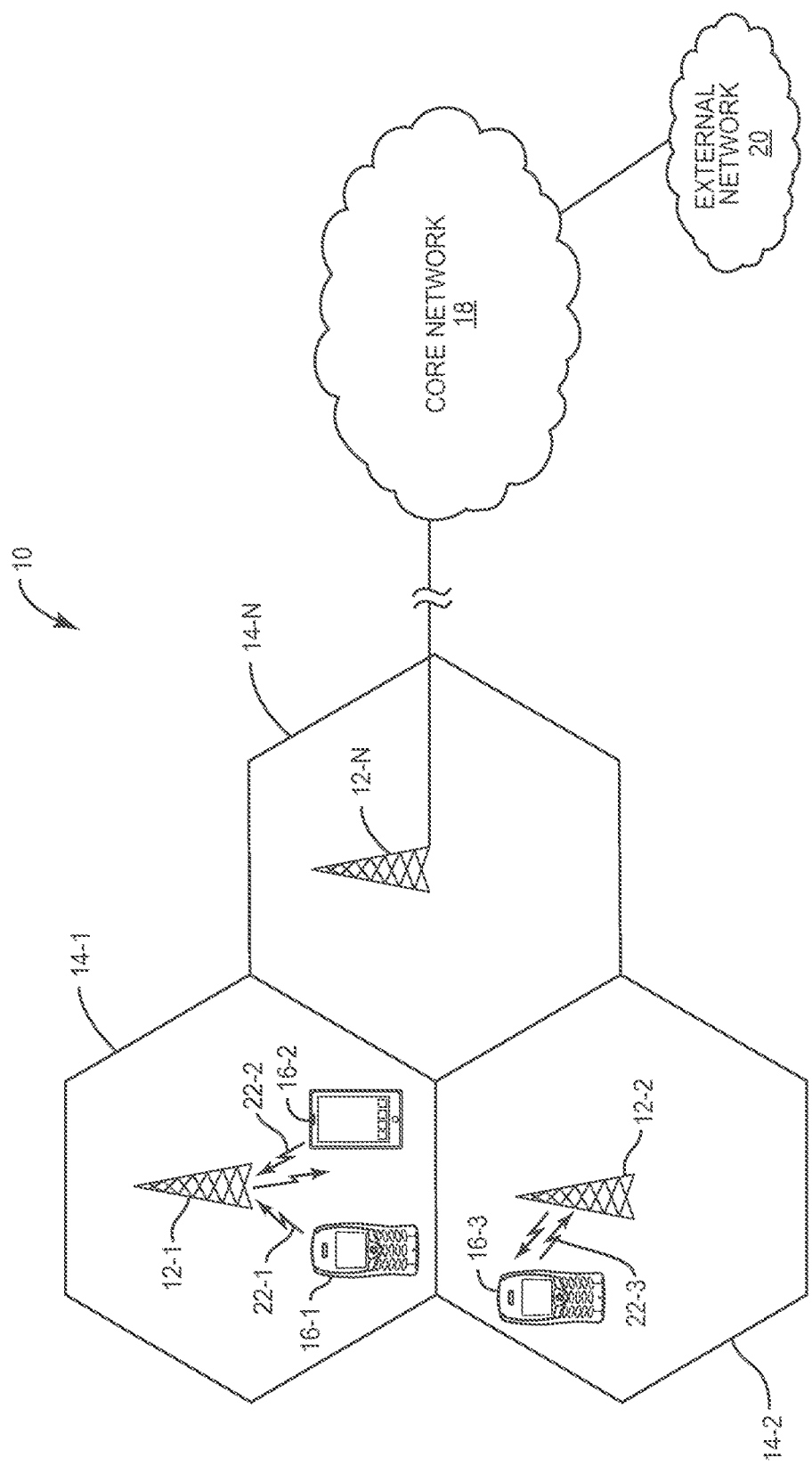
FIG. 1 is a block diagram of a wireless communication system with a base station and a wireless device configured according to one or more embodiments herein for sequence generator initialization.

FIG. 1 depicts a wireless communication system 10 according to one or more embodiments. The system 10 includes a radio access network (RAN) that comprises a plurality of geographically distributed base stations 12-1, 12-2, ... 12-N. The base stations 12-1, 12-2, ... 12-N (referred to collectively as base stations 12) provide wireless communication coverage to wireless devices 16-1, 16-2, ... 16-M within respective areas referred to as cells 14-1, 14-2, ... 14-N. Through the base stations 12, the wireless devices 16 access a core network 18, which in turn connects the devices 16 to one or more external networks 20, e.g., the Internet.

The wireless devices 16 transmit respective uplink reference signals 22 to the base stations 12. The base stations 12 employ the uplink reference signals for various reasons, such as to estimate the respective wireless channels between the base stations 12 and the devices 16. The uplink reference signals may comprise, for instance, demodulation reference signals (DMRS) that the base stations 12 use to demodulate uplink data and/or control signals, sounding reference signals (SRSs), or the like. Regardless, the devices 16 employ pseudo-random sequence generators in order to generate these uplink reference signals 22. Any given device 16-$m$ may, for example, employ two sequence generators to generate two maximal-length sequences and then modulo-2 add those sequences to form a Gold sequence on which an uplink reference signal 22 for the device 16 is based. This Gold sequence in some embodiments, for instance, dictates a cyclic shift hopping (CSH) pattern that the device 16 applies to a cyclic shift and then applies the resulting cyclic shift to a base sequence in order to generate the uplink reference signal 22.

A base station 12-$n$ governs the uplink reference signal 22-$m$ that any given device 16-$m$ transmits by, among other things, governing initialization of one or more of the device's pseudo-random sequence generators. In this regard, a base station 12-$n$ initializes a device's sequence generator by informing the device of an initialization sequence to which the generator is to be initialized, such as an initialization sequence represented in decimal form $c_{init}$ in LTE embodiments. In some embodiments, a base station 12-$n$ initializes different devices' sequence generators with different (i.e., device-specific) initialization sequences, e.g., to distinguish the devices' uplink reference signals 22 on that basis. In other embodiments, though, a base station 12-$n$ initializes different devices' sequence generators with a common (e.g., cell-specific) initialization sequence, while distinguishing the devices' uplink reference signals 22 on other bases. In still other embodiments, the a base station 12-$n$ initializes some devices' sequence generators with device-specific sequences, and other devices' sequence generators with cell-specific sequences. Regardless, a base station 12-$n$ herein advantageously encodes initialization sequences for at least some devices 16 in different ways, so as to reduce the amount of control signaling required for indicating those sequences as compared to known approaches.

Figure 2:
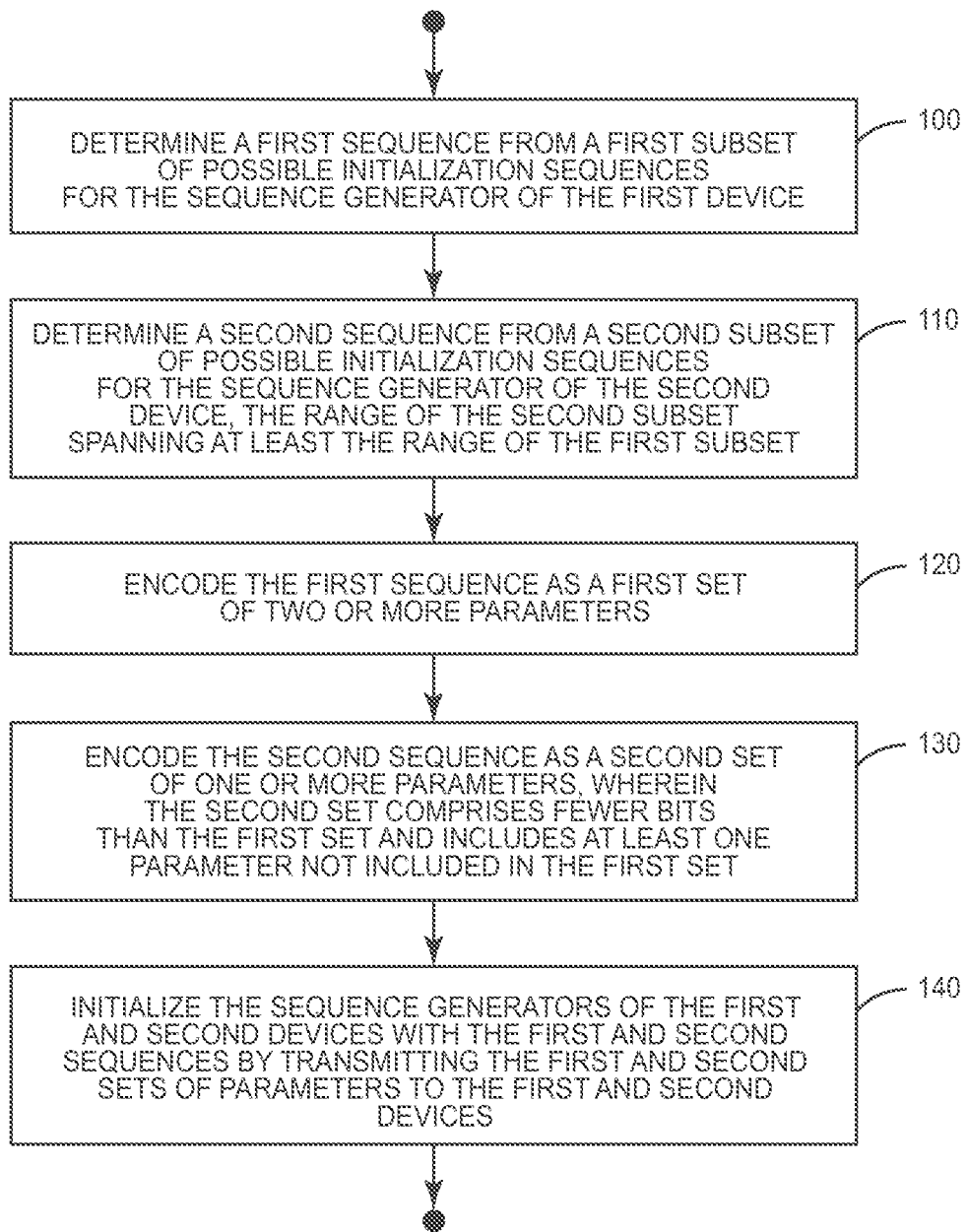
FIG. 2 is a logic flow diagram of processing performed by a base station for initializing pseudo-random sequence generators according to one or more embodiments herein.

FIG. 2 illustrates base station processing according to one or more embodiments in this regard, with reference to base station 12-1, wireless device 16-1, and wireless device 16-2 as an example. Wireless devices 16-1 and 16-2 need not be present within the base station's cell 14-1 at the same time in order for the base station 12-1 to perform the processing illustrated in FIG. 2. Indeed, as described below, the base station 12-1 determines, encodes, and signals an initialization sequence for device 16-1 independently from its determination, encoding, and signaling of an initialization sequence for device 16-2. Such remains the case regardless of whether or not the same initialization sequence is determined for the devices 16-1, 16-2 (e.g., where the sequence is cell-specific) and regardless of whether or not the initialization sequences for the devices 16-1, 16-2 are encoded using at least one common parameter. This independent processing means that the base station 12-1 may be configured in at least some embodiments to determine, encode, and signal an initialization sequence for device 16-1 at a different time than its determination, encoding, and signaling of an initialization sequence for device 16-2.

With this in mind, processing implemented by base station 12-1 in FIG. 2 includes determining a first sequence from a first subset of possible initialization sequences for a pseudo-random sequence generator of a first wireless device 16-1 (Block 100). Processing further includes determining a second sequence from a second subset of possible initialization sequences for a pseudo-random sequence generator of a second wireless device 16-2 (Block 110). The range of this second subset of possible sequences spans at least the range of the first subset of possible sequences. Determining a sequence in this way may involve computing the sequence, obtaining the sequence from memory, or acquiring the sequence in some other fashion, and may comprise determining a cell-specific sequence employed by another cell (e.g., cell 14-2).

Regardless of how these sequences are determined, processing at base station 12-1 also entails encoding the first sequence as a first set of two or more parameters (Block 120), and encoding the second sequence as a second set of one or more parameters (Block 130). This second set of parameters includes at least one parameter not included in the first set of parameters, and comprises fewer bits than the first set. That is, the initialization sequence for the second device 16-2 is encoded with fewer bits than the initialization sequence for the first device 16-1, even though the range of possible initialization sequences to be signaled to the second device 16-2 (i.e., the range of the second subset) spans at least the range of possible initialization sequences to be signaled to the first device 16-1 (i.e., the range of the first subset). Having performed this encoding, processing at the base station 12-1 finally includes initializing the sequence generators of the first and second devices 16-1, 16-2 with the first and second sequences by transmitting the first and second sets of parameters to the first and second devices 16-1, 16-2 (Block 140). As mentioned above, such initialization and transmission may be performed independently and at different times for the different devices 16-1, 16-2.

Upon receiving the first set of parameters, the first device 16-1 decodes the first sequence according to one or more rules that define the sequence as a function of the first set of parameters and then generates the uplink reference signal with the device's sequence generator initialized to that sequence. When the first device 16-1 transmits the uplink reference signal to the base station 12-1, the base station 12-1 employs the first set of parameters in order to estimate the wireless communication channel to the first device 16-1 based on the uplink reference signal. Likewise, upon receiving the second set of parameters, the second device 16-2 decodes the second sequence according to one or more rules that define the sequence as a function of the second set of parameters and then generates the uplink reference signal with the device's sequence generator initialized to that sequence. When the second device 16-2 transmits the uplink reference signal to the base station 12-1, the base station 12-1 employs the second set of parameters in order to estimate the wireless communication channel to the second device 16-2 based on the uplink reference signal.

Figure 3:
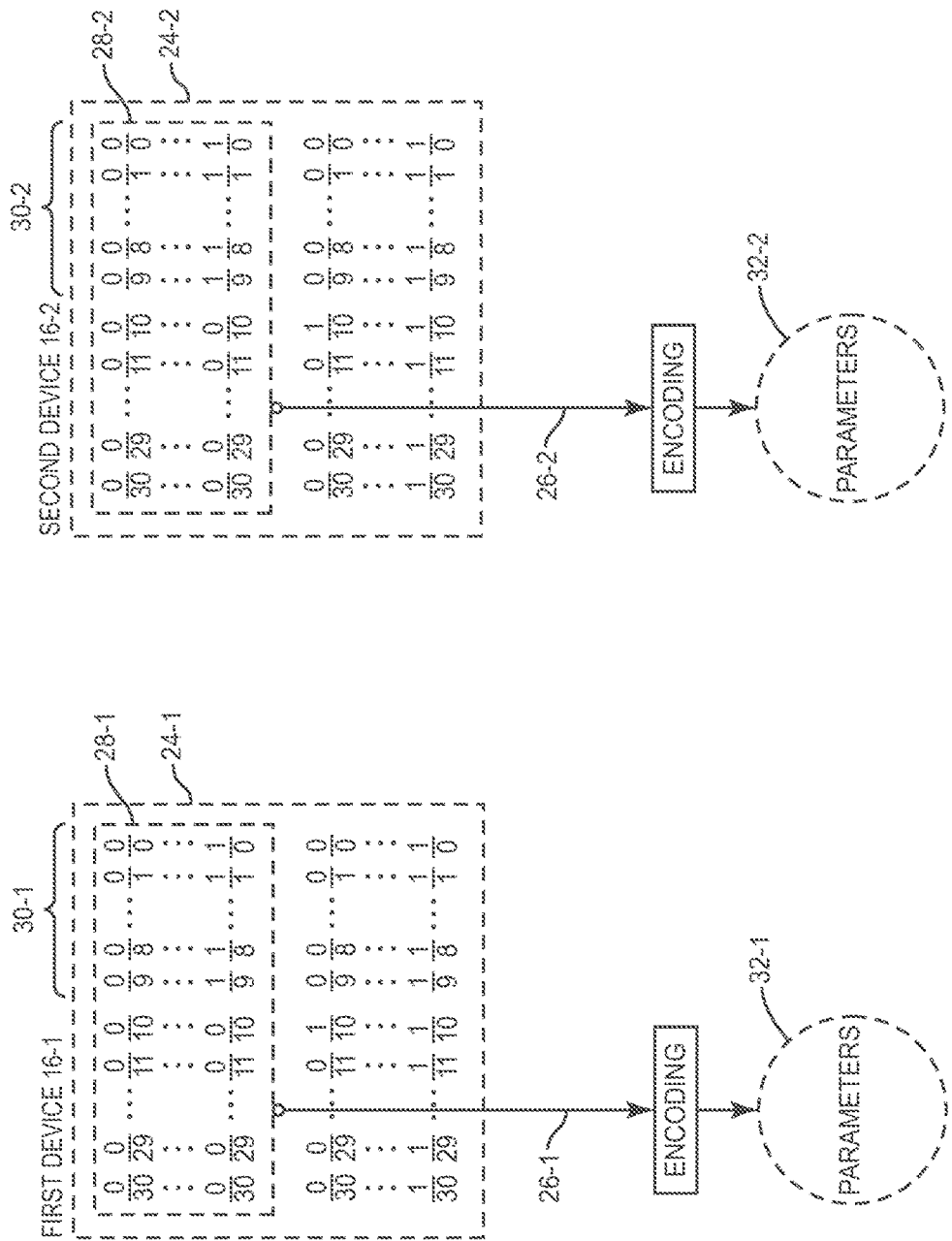
FIG. 3 illustrates an example of a base station's encoding of initialization sequences for different wireless devices according to one or more embodiments.

FIG. 3 illustrates a pictorial representation of one simple example of the base station processing. (This simple example, however, is non-limiting in terms of the number of bits used and the position of the subsets). As shown in FIG. 3, the sequence generator of a first wireless device 16-1 comprises 31 bits (labeled 0 through 30 from the least significant bit). Thus, a full set 24-1 of possible initialization sequences for the sequence generator of the first device 16-1 at least nominally includes sequence '000 . . . 000' to sequence '111 . . . 111' (i.e., a decimal range from $2^0$ to $2^{30}$).

The same can be said for a full set 24-2 of possible initialization sequences for the sequence generator of the second device 16-2 in this example.

Despite the nominal possibilities provided by the full sets 24-1, 24-2 of initialization sequences, though, the base station 12-1 excludes some of those possibilities from consideration in determining the actual initialization sequences for the devices 16-1, 16-2, so as to thereby artificially limit the initialization sequences to be signaled. Specifically, the base station 12-1 determines a first sequence 26-1 for the first device 16-1 from only a subset 28-1 of possible initialization sequences, and determines a second sequences 26-2 for the second device 16-2 from only a subset 28-2 of possible initialization sequences. As shown, the possible sequences within these subsets 28-1, 28-2 still comprise 31 bits; that is the number of bits corresponding to the range of the full sets 24-1, 24-2 of possible sequences. However, the sequences within the subsets 28-1, 28-2 have 0's for the 21 most significant bits, meaning that the ranges 30-1, 30-2 of the subsets 28-1, 28-2 are represented by only the 10 least significant bits. In this case, the range 30-2 of the second subset 28-2 spans the same range as the range 30-1 of the first subset 28-1. In general, though, the range 30-2 of the second subset 28-2 may span a greater range than the range 30-1 of the first subset 28-1 (e.g., decimal 1023 vs. 541), even if the two subsets 28-1, 28-2 are represented by the same number of bits.

Regardless, the base station 12-1 encodes the first sequence 26-1 for the first device 16-1 differently than the way it encodes the second sequence 26-2 for the second device 16-2. In some embodiments, for instance, the first and second devices 16-1, 16-2 are different types or models of devices and are therefore configured to decode the sequences 26-1, 26-2 in different ways. The first device 16-1 in one example comprises a legacy device that is configured for LTE Rel-8/9/10 and the second device 16-2 comprises a newer device that is configured for LTE Rel-11. As explained in greater detail below, because the range 30-2 of the second subset 28-2 spans at least as great as range as the range 30-1 of the first subset 28-1, the base station 12-1 is advantageously able in this case to allocate the same initialization sequence to a legacy device and a new device, but to signal the initialization sequence to the new device in a more efficient manner.

In any event, the base station 12-1 encodes the first sequence 26-1 as a first set 32-1 of two or more parameters, and encodes the second sequence 26-2 as a second set 32-2 of one or more parameters. The encoding of the second sequence 26-2 is optimized with respect to the encoding of the first sequence 26-1 at least in the sense that the second set 32-2 comprises fewer bits than the first set 32-1, even though the second set 32-2 is capable of representing at least as great of range of possible initialization sequences as the first set 32-1. These sets 32-1, 32-2 of parameters are then signaled to the wireless devices 16-1, 16-2 rather than the actual initialization sequences 26-1, 26-2. Each set 32-1, 32-2 of parameters requires fewer bits to signal than that required to signal the 31 bit sequences 26-1, 26-2 themselves, meaning that the encoding advantageously reduces the amount of control signaling required to indicate the sequences 26-1, 26-2 to the devices 16-1, 16-2.

In some embodiments, the second sequence 26-2 is encoded as a single parameter z, while the first sequence 26-1 is encoded as two or more parameters. That is, the second set 32-2 has only one parameter, namely z, even though the first set 32-1 has more than one parameter.

Figure 4:
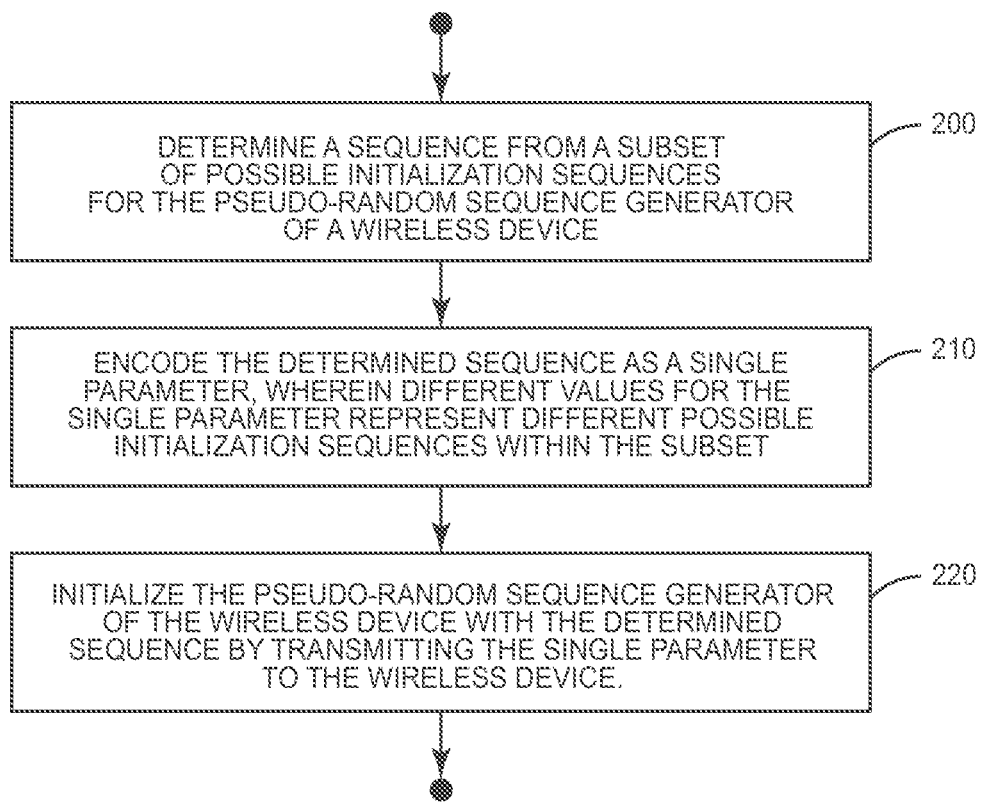
FIG. 4 is a logic flow diagram of processing performed by a base station for initializing pseudo-random sequence generators according to one or more other embodiments herein.

FIG. 4 depicts processing at the base station 12-1 with particular regard to this single parameter encoding. As shown in FIG. 4, processing at the base station 12-1 entails determining a sequence 26-2 from a subset 28-2 of possible initialization sequences for the sequence generator of a wireless device 16-2 (Block 200). Processing then includes encoding the determined sequence 26-2 as a single parameter z (Block 210). Different values for this single parameter z represent different possible initialization sequences within the subset 28-2. Processing finally includes initializing the sequence generator for the wireless device 16-2 with the determined sequence 26-2 by transmitting the single parameter z to the device 16-2 (Block 220).

In at least one embodiment, the single parameter z comprises a defined number of least significant bits from the second sequence 26-2, where the defined number corresponds to the range 30-2 of the second subset 28-2. In the example of FIG. 3, this single parameter z would therefore comprise the 10 least significant bits of the second sequence 26-2. Regardless, in this embodiment, the base station 12-1's encoding entails truncating a defined number of most significant bits of the second sequence 26-2 (e.g., the 21 most significant bits, namely bits 10 to 30), since those bits are 0's in all possible sequences within the second subset 28-2. The second device 16-2 will perform a decoding that pads the single parameter z with 0's, e.g., by pre-pending 0's to the single parameter z. Those skilled in the art will appreciate, however, that padding may be performed by the second device 16-2 in different ways in other embodiments. For example, in some embodiments the second device 16-2 pads the single parameter z by appending 0's to that parameter.

In at least one other embodiment, the second sequence 26-2 is encoded based on a defined one-to-one mapping of possible initialization sequences within the second subset 30-2 to possible values for the single parameter z. Notably, though, the range of the single parameter z is smaller than the range 30-2 of the second subset 28-2. The defined mapping in this sense effectively compresses the range 30-2 of the second subset 28-2 into the single parameter z so as to signal the second sequence 26-2 with fewer bits.

FIG. 5 illustrates an example defined mapping in the context of an LTE embodiment where the second sequence 26-2 selected from the second subset 28-2 is represented as $c_{init}$, which is a decimal representation of the second sequence 26-2. As shown in FIG. 4, the subset 28-2 of possible initialization sequences $c_{init}$ is sparse in the sense that it does not include all initialization sequences within the subset's range 30-2. For example, the subset 28-2 does not include $c_{init}$ values of 30, 31, 62, 63, 94, 95, and so forth, even though the subset's range 30-2 spans from $c_{init}$ values of 0 to 541. The defined mapping maps those possible initialization sequences $c_{init}$ within the subset 28-2 to possible values for the single parameter z (here, shown as a decimal representation), so that z is not sparse. According to the mapping, the initialization sequences $c_{init}$=32 is encoded as z=30, $c_{init}$=33 is encoded as z=31, $c_{init}$=64 is encoded as z=60, $c_{init}$=65 is encoded as z=61, and so forth. Due to the nature of this mapping, the {0,541} range 30-2 of the second subset 28-2 of possible initialization sequences $c_{init}$ is compressed into a {0,509} range of the single parameter z. Notably, therefore, signaling of the single parameter z requires 9 bits, which is 1 fewer bit to signal than the 10 bits that would be required to signal the parameter z as described above without this compression.

FIG. 5 of course illustrates the defined mapping as being a look-up table that is obtained by the base station 12-1 for encoding. The base station 12-1 in some embodiments obtains the table from memory, while in other embodiments the base station 12-1 obtains the table by generating it on an as needed basis, according to a predefined formula. In either case, the base station 12-1 selects the second sequence 26-2 $c_{init}$ from the second subset 28-2 and then determines the parameter z that corresponds to the selected sequence $c_{init}$ in the look-up table.

In other embodiments, the mapping is embodied in ways other than a look-up table. In one embodiment, for example, the defined mapping exists as an algorithm or formula used by the base station 12-1 for encoding. Specifically, the base station 12-1 encodes the selected initialization sequence $c_{init}$ as the single parameter $$z = c_{init} - 2\left\lfloor \frac{c_{init}}{32} \right\rfloor,$$

where $\lfloor x \rfloor$ denotes a floor function that rounds x to the nearest integer less than or equal to x.

Furthermore, although FIG. 5 illustrates the single parameter z as if it has the minimum range needed for compressing the range of the second subset 28-2 of possible initialization sequences $c_{init}$, this need not be the case. Consider, for example, embodiments where the second sequence 26-2 $c_{init}$ corresponds to a CSH that the device 16-2 applies to a cyclic shift for generating the uplink reference signal 22-2. In one or more embodiments in this case, the base station 12-1 jointly encodes the second sequence 26-2 $c_{init}$ and an indication of whether or not CSH is enabled as the second set 32-2 of one or more parameters. Thus, where the second set 32-2 of parameters just includes the single parameter z, the range of z is extended in order to indicate whether or not CSH is enabled.

FIGS. 6A-6B illustrate two different examples of this. In both examples, the base station 12-1 performs joint encoding such that the single parameter z not only indicates the second sequence 26-2 $c_{init}$ as described above, but also indicates a flag called CSH_ENABLE. If CSH_ENABLE=1, CSH is enabled. If CSH_ENABLE=0, CSH is not enabled.

According to the joint encoding in FIG. 6A, the base station 12-1 performs joint encoding such that the single parameter z indicates that CSH_ENABLE=1 if the parameter z has a decimal value between 0 and 509. These possible values of z similarly map to possible initialization sequences $c_{init}$, as shown in FIG. 5, meaning that the joint encoding also indicates the initialization sequence $c_{init}$ to be used when CSH_ENABLE=1. By contrast, if the parameter z has any other decimal value, the parameter z indicates that CSH_ENABLE=0. With CSH disabled in this case, the initialization sequences $c_{init}$ is not defined, or at least is not relevant.

Although FIG. 6A contemplates that one or more values of the single parameter z (jointly or individually) indicate that CSH is disabled, FIG. 6B more specifically shows a single value (i.e., z=511) as indicating that CSH is disabled. Indicating CSH_ENABLE with only a single value of the parameter z proves simpler in practice, and also allows for the signaling of additional information other than the initialization sequence $c_{init}$ and CSH_ENABLE. Of course, embodiments that only utilize 512 values for the parameter z prove advantageous for signaling z with only 9 bits, rather than 10 bits for embodiments that utilize more than 512 values for z.

Figure 7:
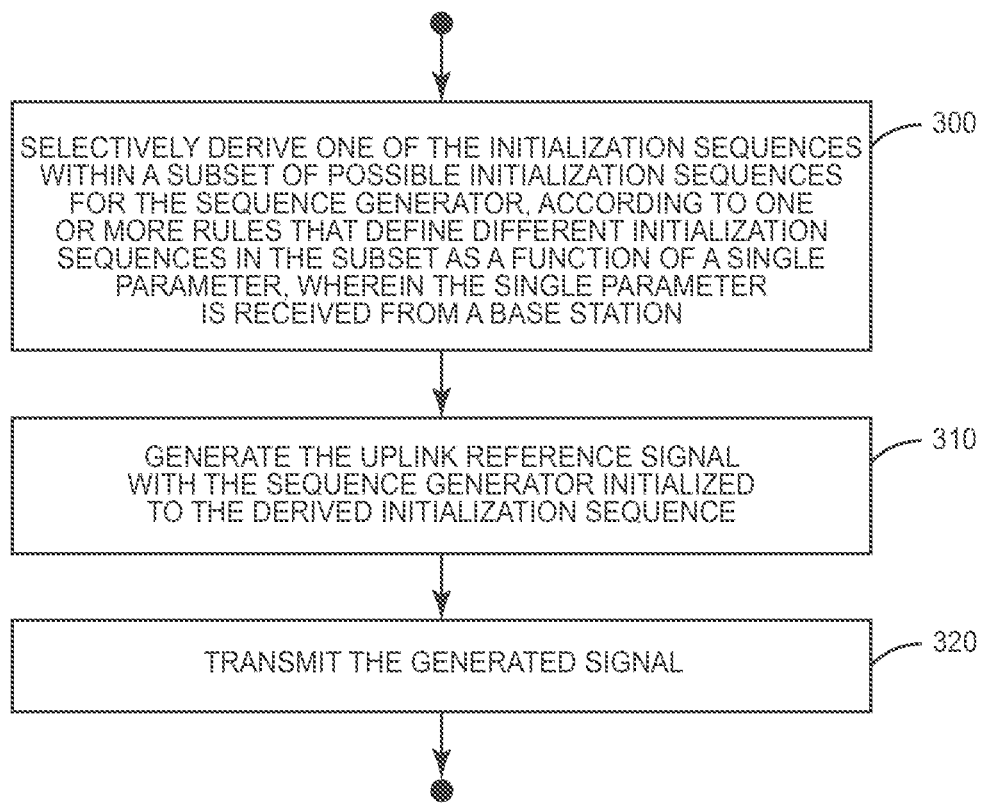
FIG. 7 is a logic flow diagram of processing performed by a wireless device for initializing a pseudo-random sequence generator according to one or more embodiments herein.

Regardless of whether or not such joint encoding is employed, though, the second wireless device 16-2 herein is configured to receive the single parameter z from the base station 12-1 and to initialize a pseudo-random sequence generator on which to base uplink reference signal generation according to that single parameter z. FIG. 7 illustrates processing that the device 16-2 performs in this regard.

As shown in FIG. 7, processing at the device 16-2 entails selectively deriving one of the second initialization sequences 26-2 within the second subset 28-2 of possible initialization sequences for the sequence generator, according to one or more rules that define different initialization sequences in the subset 28-2 as a function of the single parameter z (Block 300). Processing further includes generating the uplink reference signal 22-2 with the sequence generator initialized to the derived initialization sequence 26-2 (Block 310), and transmitting the generated signal 22-2 (Block 320).

In embodiments where the base station 12-1 has encoded the second initialization sequence 26-2 to be a single parameter z that comprises a defined number of least significant bits from the second sequence 26-2, the wireless device's derivation entails padding the single parameter z with a defined number of zeroes. In some embodiments, this padding involves appending the defined number of zeroes to the single parameter z. In other embodiments, though, padding includes pre-pending the defined number of zeroes to the single parameter z. In this case, the device 16-2 effectively derives a second sequence 26-2 that has its most significant bits padded with zeroes.

By contrast, in embodiments where the base station 12-1 has encoded the second initialization sequence 26-2 according to a defined one-to-one mapping with the single parameter z (e.g., as in FIG. 5), the device 16-2 derives the sequence 26-2 based on that same mapping. In some embodiments, for example, the device 16-2 stores the look-up table of FIG. 5 in memory and references that table to map the received parameter z to the second initialization sequence 26-2 $c_{init}$. Such may entail converting the decimal representation of $c_{init}$ into a corresponding binary representation. In other embodiments, the device 16-2 derives the second initialization sequence 26-2 $c_{init}$ according to an algorithm or formula that is the counterpart to that used by the base station 12-1 to encode the sequence 26-2. For example, the device 16-2 derives the sequence 26-2 $c_{init}$ according to $$c_{init} = z + 2\lfloor \frac{z}{30} \rfloor.$$

In embodiments where the sequence 26-2 $c_{init}$ corresponds to a CSH pattern, the device 16-2 generates the uplink reference signal 22-2 by determining the CSH pattern from the derived sequence 26-2. The device 16-2 then applies the CSH pattern to a cyclic shift, and finally applies the resulting cyclic shift to a base sequence to generate the uplink reference signal 22-2. Of course, where the single parameter z jointly encodes the sequence 26-2 as well as CSH_ENABLE, the device 16-2 derives CSH_ENABLE according to one or more rules that define CSH_ENABLE as a function of the parameter z, and then selectively determine and apply a CSH pattern depending on CSH_ENABLE.

Although embodiments illustrated with respect to FIGS. 5-7 show the second sequence 26-2 encoded as a single parameter z, other embodiments herein encode the second sequence 26-2 as a linear combination of two parameters x,y; that is, instead of the second set 32-2 of parameters in FIG. 3 comprising only a single parameter z, the second set 32-2 comprises two parameters x,y. In this case, parameter y encodes a defined number of least significant bits from the second sequence 26-2. Parameter x encodes a defined number of more significant bits from the second sequence 26-2, not including one or more most significant bits from the second sequence 26-2, i.e., those defined number (e.g., 21) of most significant bits that are 0's. FIG. 8 illustrates an example of this where a look-up table embodies the linear combination of x,y.

As shown in FIG. 8, the look-up table maps the linear combination of x=0 and y={0, 1, . . . 29} to possible initialization sequences $c_{init}$={0, 1, . . . 29}. Similarly, the table maps the linear combination of x=1 and y={0, 1, . . . 29} to possible initialization sequences $c_{init}$={32, 33, . . . 61}, and so forth up. With the range of x being {0, 16} and the range of y being {0, 29}, the second sequence 26-2 is encoded with 10 bits, including 5 bits for x and 5 bits for y.

FIG. 8 of course illustrates the defined mapping as being a look-up table that is obtained by the base station 12-1 for encoding. The base station 12-1 in some embodiments obtains the table from memory, while in other embodiments the base station 12-1 obtains the table by generating it on an as needed basis, according to a predefined formula. In either case, the base station 12-1 selects the second sequence 26-2 $c_{init}$ from the second subset 28-2 and then determines the parameters x,y that correspond to the selected sequence $c_{init}$ in the look-up table. The device 16-2 receives these parameters x,y and correspondingly derives the second sequence 26-2 according to this same mapping.

In other embodiments, the mapping is embodied in ways other than a look-up table. In one embodiment, for example, the defined mapping exists as an algorithm or formula used by the base station 12-1 for encoding and by the device 16-2 for decoding. Specifically, the base station 12-1 encodes the selected initialization sequence $c_{init}$ as the parameters x,y, and the device 16-2 decodes the sequence $c_{init}$ as a function of the parameters x,y, according to $c_{init}$=32x+y.

As briefly mentioned above, the base station 12-1 in some embodiments initializes the sequence generators for the different devices 16-1, 16-2 with a common initialization sequence. Thus, in this case, the base station 12-1 selects the first and second sequences 26-1, 26-2 so that they are the same. In some embodiments, the initialization sequence selected is a common sequence because it is common among at least some of the devices 16 in the cell 14-1. For example, the initialization sequence selected, and the subsequent encoding thereof, depends on a physical cell identity for the cell 14-1.

Where such embodiments employ LTE, for instance, the base station 12-1 determines the decimal representation of the first and second initialization sequence 26-1, 26-2 according to $$c_{init} = \lfloor \frac{N_{ID}^{cell}}{30} \rfloor \cdot 2^5 + f_{ss}^{PUSCH},$$

where $N_{ID}^{cell}$ is the physical cell identity for cell 14-1 and takes on 504 different integer values, and $f_{ss}^{PUSCH}$ is the sequence-shift pattern for PUSCH that takes on 30 different integer values {0,29}. Hence, it can be seen that the range for $c_{init}$ is {0,541}. The base station 12-1 encodes the first initialization sequence 26-1 for the first device 16-1 as a set 32-1 of parameters that simply includes $N_{ID}^{cell}$ and $f_{ss}^{PUSCH}$. Even though the second initialization sequence 26-2 for the second device 16-2 is the same as the first sequence 26-1, the base station 12-1 encodes that second sequence 26-2 differently, according to any of the embodiments described above. The base station 12-1 may for instance encode the second sequence 26-2 as the single parameter z (either directly as the 10 least significant digits of the sequence, or by mapping the sequence to the parameter z), or encode the second sequence 26-2 as the parameters x,y, where $$x = \left\lfloor \frac{N_{ID}^{cell}}{30} \right\rfloor \text{ and } y = f_{ss}^{PUSCH}.$$

In other embodiments, the base station 12-1 initializes the sequence generators for the different devices 16-1, 16-2 with different sequences that are device-specific. In this case, the base station 12-1 determines the initialization sequences 26-1, 26-2 based on at least one parameter that is device-specific. In at least some embodiments, the base station 12-1 determines the sequences 26-1, 26-2 without regard to the physical cell identity.

In still other embodiments, the base station 12-1 initializes the sequence generator for the first device 16-1 with a cell-specific sequence, but initializes the sequence generator for the second device 16-2 with a device-specific sequence. Where the embodiments employ LTE, for instance, the base station 12-1 encodes the first initialization sequence 26-1 for the first device 16-1 as a set 32-1 of parameters that simply includes $N_{ID}^{cell}$ and $f_{ss}^{PUSCH}$. By contrast, the base station-12 determines the second initialization sequence 26-2 for the second device 16-2 without regard to $N_{ID}^{cell}$ and then encodes the second sequence 26-2 as the single parameter z, or encodes the second sequence 26-2 as the parameters x,y, where those parameters do not depend on $N_{ID}^{cell}$.

In at least some of these embodiments, the base station 12-1 initializes the sequence generators in this way (i.e., in a cell-specific manner for the first device 16-1 and in a device-specific manner for the second device 16-2) in order to maintain backwards compatibility with respect to the first device 16-1, while achieving inter-cell orthogonality for the second device 16-2 with respect to a third wireless device 16-3 in a different cell 14-2. Where the embodiments employ LTE, for example, the first device 16-1 comprises a legacy device that is configured for LTE Rel-8/9/10 and the second device 16-2 comprises a newer device that is configured for LTE Rel-11.

In some embodiments, the third device 16-3 is a legacy device. In this case, the base station 12-1 determines the second sequence 26-2 for the second device 16-2 by selecting from the second subset 28-2 the initialization sequence that matches the initialization sequence for a pseudo-random sequence generator of the third device 28-1. The base station 12-1 is able to do this because the range of the second subset 28-2 spans at least the range of the subset of possible initialization sequences for the third device 16-3; that is, the initialization sequence for the second device 16-1 is able to take on values that are possible for the third device 16-3. With the initialization sequences for the second and third devices 16-2, 16-3 the same, the base station 12-1 is able to achieve inter-cell orthogonality for these paired devices 16-2, 16-3 through use of different orthogonal cover codes (OCCs) for the devices. Notably, therefore, by configuring the initialization sequences in this way, the base station 12-1 is able to arbitrarily pair a newer device 16-2 in cell 14-1 with any legacy device 16-3 in a different cell 14-2 for achieving inter-cell orthogonality between those devices' uplink reference signals 22-2, 22-3.

In the above embodiment, the base station 12-1 may receive the initialization sequence for the third device 16-3 from the base station 12-2 serving cell 14-2. Alternatively, the base station 12-1 may otherwise obtain that sequence, such as through knowledge of $N_{ID}^{cell}$ for cell 14-2 in embodiments wherein the sequence for the third device 16-3 is cell-specific. Of course, the base station 12-1 may pair a newer device 16-1 in cell 14-1 with newer devices in a different cell 14-2 in analogous manner.

Those skilled in the art will appreciate that while the above embodiments were illustrated with particular values, the embodiments are not limited in this respect. For example, although the second set 32-2 of parameters was described as being 9 or 10 bits, and the second sequence 26-2 as being 31 bits, other bit sizes are possible. Likewise, while the ranges of the first and second subsets 28-1, 28-2 were described as spanning between a minimum value of 0 and a maximum value no greater than 541, other ranges are possible.

Furthermore, those skilled in the art will appreciate that although terminology from 3GPP LTE-Advanced has been used to describe embodiments herein, this should not be seen as limiting the scope of the invention to only the aforementioned system. Other wireless systems, including WCDMA, WiMax, UMB and GSM, may also benefit from exploiting the techniques herein.

Also note that terminology such as base station and wireless device (e.g., UE) should be considering non-limiting and does in particular not imply a certain hierarchical relation between the two; in general "base station" could be considered as device 1 and "UE" device 2, and these two devices communicate with each other over some radio channel.

Although the above embodiments focused on the UL of an LTE Rel-11 network, other embodiments may be applied even to the DL and to other communication protocols.

Figure 9:
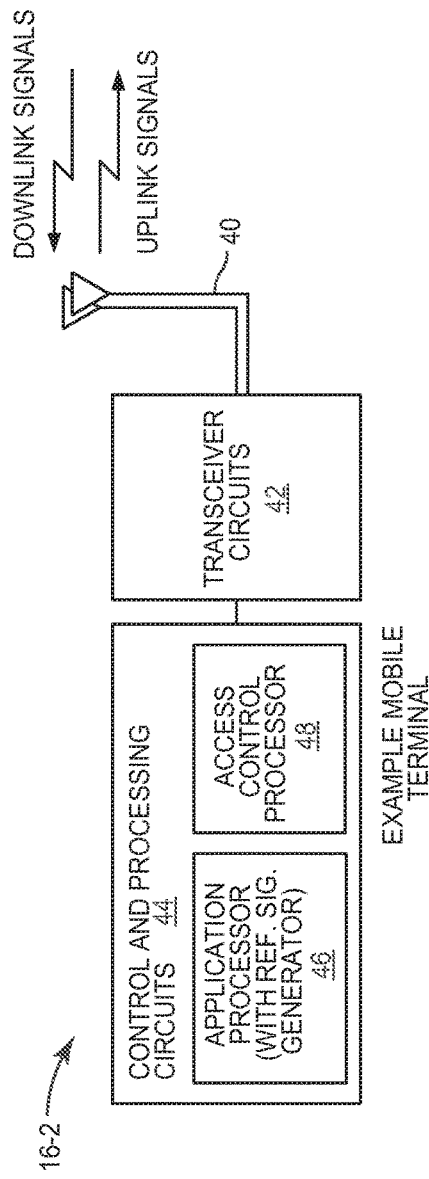
FIG. 9 is a block diagram that illustrates a wireless device configured to initialize a pseudo-random sequence generator according to one or more embodiments herein.

In view of the above modifications and variations, those skilled in the art will appreciate that FIG. 9 illustrates an example wireless device 16-2 configured according to one or more embodiments herein. As shown in FIG. 9, the wireless device 16-2 is at least logically divided into an application processor 46 that runs user-oriented functions (software applications, user interface control, etc.) and an access processor 48 that implements the air interface protocols, including any encryption and authentication processing needed for network access and subscriber accounting via transceiver circuits 42 and antenna(s) 40.

In general, the wireless device 16-2 includes one or more processing circuits 44, such as microprocessors, digital signal processors, or other digital processors, and associated memory or other computer-readable media, for storing, e.g., a computer program the execution of which configures the device 16-2 according to the teachings herein. In particular, the device 16-2 includes a processing circuit (e.g., a reference signal generator) 46 that is specially configured, e.g., by the execution of stored computer program instructions, to generate a reference signal for transmission as described above.

Specifically, the processing circuit 46 is configured to selectively derive one of the initialization sequences within a subset of possible initialization sequences for the sequence generator, according to one or more rules that define different initialization sequences in the subset as a function of a single parameter. The processing circuit 46 is further configured to generate the uplink reference signal based on the derived initialization sequence, and to transmit the generated signal via the transceiver 42.

Figure 10:
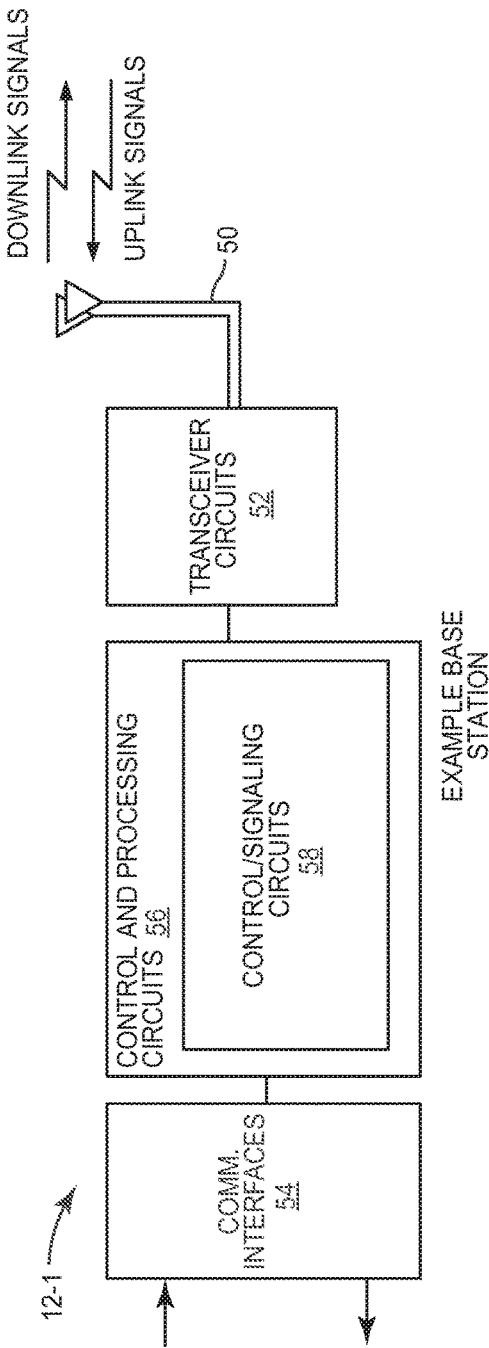
FIG. 10 is a block diagram that illustrates a base station configured to initialize pseudo-random sequence generators according to one or more embodiments herein.

FIG. 10 likewise illustrates an example base station 12-1 configured according to one or more embodiments herein. Those skilled in the art will recognize that the base station 12-1 in one or more embodiments includes one or more processing circuits 56, such as microprocessors, digital signal processors, or other digital processors, and associated memory or other computer-readable media, for storing, e.g., a computer program the execution of which configures the base station 12-1 to perform the processing shown in FIG. 2 or 4

When configured to perform the processing shown in FIG. 2, the base station 12-1 includes one or more processing circuits (e.g., control/signaling circuits) 58 that are specially configured, e.g., by the execution of stored computer program instructions, to initialize pseudo-random sequence generators on which wireless devices 16 base generation of uplink reference signals 22 as described above. The one or more processing circuits 58 are configured to determine a first sequence 26-1 from a first subset 28-1 of possible initialization sequences for a pseudo-random sequence generator of a first wireless device 16-1. The one or more processing circuits 58 are further configured to determine a second sequence 26-2 from a second subset 28-2 of possible initialization sequences for a pseudo-random sequence generator of a second wireless device 16-2. The range of this second subset 28-2 spans at least the range of the first subset 28-1. Moreover, the one or more processing circuits 58 are configured to encode the first sequence 26-1 as a first set 32-1 of two or more parameters, and to encode the second sequence 26-2 as a second set 32-2 of one or more parameters. This second set 32-2 comprises fewer bits than the first set 32-1, and includes at least one parameter not included in the first set 32-1. Finally, the one or more processing circuits 58 are configured to initialize the sequence generators of the first and second devices 16-1, 16-2 with the first and second sequences 26-1, 26-2 by transmitting the first and second sets 32-1, 32-2 of parameters to the first and second devices 16-1, 16-2.

When configured to perform the processing shown in FIG. 4, the base station 12-1 includes one or more processing circuits (e.g., control/signaling circuits) 58 that are specially configured, e.g., by the execution of stored computer program instructions, to initialize a pseudo-random sequence generator on which a wireless device 16-2 bases generation of an uplink reference signal. The one or more processing circuits 58 are configured in this regard to determine a sequence 26-2 from a subset 28-2 of possible initialization sequences for the pseudo-random sequence generator of the device 16-2. The one or more processing circuits 58 are configured to then encode the determined sequence 26-2 as a single parameter z. Different values for this single parameter z represent different possible initialization sequences within the subset 28-2. Finally, the one or more processing circuits 58 are configured to initialize the pseudo-random sequence generator of the wireless device 16-2 with the determined sequence 26-2 by transmitting the single parameter z to the wireless device 16-2.

Those skilled in the art will recognize that the present invention may be carried out in other ways than those specifically set forth herein without departing from essential characteristics of the invention. The embodiments are thus to be considered in all respects as illustrative and not restrictive, and all changes coming within the meaning and equivalency range of the appended claims are intended to be embraced therein.

What is claimed is:

1. A user equipment configured to initialize a pseudo-random sequence generator on which to base generation of an uplink reference signal, comprising:
a transceiver; and
one or more processing circuits configured to:
derive one of the initialization sequences within a subset of possible initialization sequences for the pseudo-random sequence generator, according to one or more rules that define different initialization sequences in the subset as a function of a single parameter, by deriving the initialization sequence based on a defined one-to-one mapping of the possible initialization sequences in the subset to possible values for the single parameter, wherein the range of the single parameter is smaller than the range of the subset, wherein the one or more processing circuits are configured to derive the initialization sequence $c_{init}$ according to $$c_{init} = z + 2\left\lfloor \frac{z}{30} \right\rfloor,$$

wherein z is the single parameter and $\lfloor x \rfloor$ denotes a floor function that rounds x to the nearest integer less than or equal to x;
generate the uplink reference signal with the pseudo-random sequence generator initialized to the derived initialization sequence; and
transmit the generated signal via the transceiver.

2. The user equipment of claim 1, wherein each possible initialization sequence corresponds to a possible cyclic shift hopping pattern, and wherein the derived initialization sequence corresponds to a cyclic shift hopping pattern that the user equipment applies to a cyclic shift to generate the uplink reference signal.

3. The user equipment of claim 1, wherein the single parameter comprises 9 or 10 bits, and the initialization sequence comprises 31 bits.

4. The user equipment of claim 1, wherein the range of the single parameter spans between a minimum value of 0 and a maximum value no greater than 541.

5. The user equipment of claim 1, wherein the initialization sequence comprises a user equipment specific sequence.

6. The user equipment of claim 1, wherein when cyclic shift hopping is enabled for the user equipment the one or more processing circuits are configured to generate the uplink reference signal by:
determining a cyclic shift hopping pattern from the derived initialization sequence;
applying the cyclic shift hopping pattern to a cyclic shift; and
applying the resulting cyclic shift to a base sequence.

7. The user equipment of claim 6, wherein the one or more processing circuits are further configured to derive an indication of whether or not cyclic shift hopping is enabled for the user equipment according to one or more rules that define such indication as another function of the single parameter.

8. The user equipment of claim 1, wherein the one or more processing circuits are further configured to receive, via the transceiver, the single parameter from a base station.

9. The user equipment of claim 1, wherein said subset of possible initialization sequences is sparse in the sense that the subset does not include all initialization sequences within the subset's range, and wherein the defined one-to-one mapping maps the possible initialization sequences within the subset to possible values for the single parameter so that the single parameter is not sparse.

10. The user equipment of claim 1, wherein the defined one-to-one mapping compresses the range of the subset into the smaller range of the single parameter.

11. The user equipment of claim 1, wherein the defined one-to-one mapping maps the possible initialization sequences $c_{init}$ to the single parameter z by mapping:
values 0, 1, . . . , 29 of $c_{init}$ to values 0, 1, . . . , 29 of z, respectively;
values 32, 33, . . . , 61 of $c_{init}$ to values 30, 31, . . . , 59 of z, respectively;
values 64, 65, . . . , 93 of $c_{init}$ to values 60, 61, . . . , 89 of z, respectively;
values 96, 97, . . . 125 of $c_{init}$ to values 90, 91, . . . , 119 of z, respectively;
values 128, 129, . . . 157 of $c_{init}$ to values 120, 121, . . . , 149 of z, respectively;
values 160, 161, . . . , 189 of $c_{init}$ to values 150, 151, . . . , 179 of z, respectively;
values 192, 193, . . . , 221 of $c_{init}$ to values 180, 181, . . . , 209 of z, respectively;
values 224, 225, . . . , 253 of $c_{init}$ to values 210, 211, . . . , 239 of z, respectively;
values 256, 257, . . . , 285 of $c_{init}$ to values 240, 241, . . . , 269 of z, respectively;
values 288, 289, . . . , 317 of $c_{init}$ to values 270, 271, . . . , 299 of z, respectively;
values 320, 321, . . . , 349 of $c_{init}$ to values 300, 301, . . . , 329 of z, respectively;
values 352, 353, . . . , 381 of $c_{init}$ to values 330, 331, . . . , 359 of z, respectively;
values 384, 385, . . . , 413 of $c_{init}$ to values 360, 361, . . . , 389 of z, respectively;
values 416, 417, . . . , 445 of $c_{init}$ to values 390, 391, . . . , 419 of z, respectively;
values 448, 449, . . . , 477 of $c_{init}$ to values 420, 421, . . . , 449 of z, respectively;
values 480, 481, . . . , 509 of $c_{init}$ to values 450, 451, . . . , 479 of z, respectively; and
values 512, 513, . . . , 541 of $c_{init}$ to values 480, 481, . . . , 509 of z, respectively.

12. The user equipment of claim 1:
wherein the one or more processing circuits are further configured to receive, via the transceiver, the single parameter from a base station;
wherein each possible initialization sequence corresponds to a possible cyclic shift hopping pattern;
wherein the derived initialization sequence corresponds to a cyclic shift hopping pattern that the user equipment applies to a cyclic shift to generate the uplink reference signal;
wherein the single parameter comprises 9 or 10 bits, and the initialization sequence comprises 31 bits;
wherein the range of the single parameter spans between a minimum value of 0 and a maximum value no greater than 541;
wherein when cyclic shift hopping is enabled for the user equipment the one or more processing circuits are configured to generate the uplink reference signal by determining a cyclic shift hopping pattern from the derived initialization sequence, applying the cyclic shift hopping pattern to a cyclic shift, and applying the resulting cyclic shift to a base sequence; and
wherein the defined one-to-one mapping maps the possible initialization sequences $c_{init}$ to the single parameter z by mapping:
values 0, 1, . . . , 29 of $c_{init}$ to values 0, 1, . . . , 29 of z, respectively;
values 32, 33, . . . , 61 of $c_{init}$ to values 30, 31, . . . , 59 of z, respectively;
values 64, 65, . . . , 93 of $c_{init}$ to values 60, 61, . . . , 89 of z, respectively;
values 96, 97, . . . 125 of $c_{init}$ to values 90, 91, . . . , 119 of z, respectively;
values 128, 129, . . . 157 of $c_{init}$ to values 120, 121, . . . , 149 of z, respectively;
values 160, 161, . . . , 189 of $c_{init}$ to values 150, 151, . . . , 179 of z, respectively;
values 192, 193, . . . , 221 of $c_{init}$ to values 180, 181, . . . , 209 of z, respectively;
values 224, 225, . . . , 253 of $c_{init}$ to values 210, 211, . . . , 239 of z, respectively;
values 256, 257, . . . , 285 of $c_{init}$ to values 240, 241, . . . , 269 of z, respectively;
values 288, 289, . . . , 317 of $c_{init}$ to values 270, 271, . . . , 299 of z, respectively;
values 320, 321, . . . , 349 of $c_{init}$ to values 300, 301, . . . , 329 of z, respectively;
values 352, 353, . . . , 381 of $c_{init}$ to values 330, 331, . . . , 359 of z, respectively;
values 384, 385, . . . , 413 of $c_{init}$ to values 360, 361, . . . , 389 of z, respectively;
values 416, 417, . . . , 445 of $c_{init}$ to values 390, 391, . . . , 419 of z, respectively;
values 448, 449, . . . , 477 of $c_{init}$ to values 420, 421, . . . , 449 of z, respectively;
values 480, 481, . . . , 509 of $c_{init}$ to values 450, 451, . . . , 479 of z, respectively; and
values 512, 513, . . . , 541 of $c_{init}$ to values 480, 481, . . . , 509 of z, respectively.

13. A method implemented by a user equipment for initializing a pseudo-random sequence generator on which to base generation of an uplink reference signal, comprising:
deriving one of the initialization sequences within a subset of possible initialization sequences for the pseudo-random sequence generator, according to one or more rules that define different initialization sequences in the subset as a function of a single parameter, wherein said deriving comprises deriving the initialization sequence based on a defined one-to-one mapping of the possible initialization sequences in the subset to possible values for the single parameter, wherein the range of the single parameter is smaller than the range of the subset, and wherein said deriving comprises deriving the initialization sequence $$c_{init} \text{ according to } c_{init} = z + 2\lfloor \frac{z}{30} \rfloor,$$

wherein z is the single parameter and $\lfloor x \rfloor$ denotes a floor function that rounds x to the nearest integer less than or equal to x;
generating the uplink reference signal with the pseudo-random sequence generator initialized to the derived initialization sequence; and
transmitting the generated signal.

14. The method of claim 13, wherein each possible initialization sequence corresponds to a possible cyclic shift hopping pattern, and wherein the derived initialization sequence corresponds to a cyclic shift hopping pattern that the user equipment applies to a cyclic shift to generate the uplink reference signal.

15. The method of claim 13, wherein the single parameter comprises 9 or 10 bits, and the initialization sequence comprises 31 bits.

16. The method of claim 13, wherein the range of the single parameter spans between a minimum value of 0 and a maximum value no greater than 541.

17. The method of claim 13, wherein the initialization sequence comprises a user equipment specific sequence.

18. The method of claim 13, wherein when cyclic shift hopping is enabled for the user equipment said generating comprises:
   determining a cyclic shift hopping pattern from the derived initialization sequence;
   applying the cyclic shift hopping pattern to a cyclic shift; and
   applying the resulting cyclic shift to a base sequence.

19. The method of claim 18, further comprising deriving an indication of whether or not cyclic shift hopping is enabled for the user equipment according to one or more rules that define such indication as another function of the single parameter.

20. The method of claim 13, further comprising receiving the single parameter from a base station.

21. The method of claim 13, wherein said subset of possible initialization sequences is sparse in the sense that the subset does not include all initialization sequences within the subset's range, and wherein the defined one-to-one mapping maps the possible initialization sequences within the subset to possible values for the single parameter so that the single parameter is not sparse.

22. The method of claim 13, wherein the defined one-to-one mapping compresses the range of the subset into the smaller range of the single parameter.

23. The method of claim 13, wherein the defined one-to-one mapping maps the possible initialization sequences $c_{init}$ to the single parameter z by mapping:
   values 0, 1, . . . , 29 of $c_{init}$ to values 0, 1, . . . , 29 of z, respectively;
   values 32, 33, . . . , 61 of $c_{init}$ to values 30, 31, . . . , 59 of z, respectively;
   values 64, 65, . . . , 93 of $c_{init}$ to values 60, 61, . . . , 89 of z, respectively;
   values 96, 97, . . . 125 of $c_{init}$ to values 90, 91, . . . , 119 of z, respectively;
   values 128, 129, . . . 157 of $c_{init}$ to values 120, 121, . . . , 149 of z, respectively;
   values 160, 161, . . . , 189 of $c_{init}$ to values 150, 151, . . . , 179 of z, respectively;
   values 192, 193, . . . , 221 of $c_{init}$ to values 180, 181, . . . , 209 of z, respectively;
   values 224, 225, . . . , 253 of $c_{init}$ to values 210, 211, . . . , 239 of z, respectively;
   values 256, 257, . . . , 285 of $c_{init}$ to values 240, 241, . . . , 269 of z, respectively;
   values 288, 289, . . . , 317 of $c_{init}$ to values 270, 271, . . . , 299 of z, respectively;
   values 320, 321, . . . , 349 of $c_{init}$ to values 300, 301, . . . , 329 of z, respectively;
   values 352, 353, . . . , 381 of $c_{init}$ to values 330, 331, . . . , 359 of z, respectively;
   values 384, 385, . . . , 413 of $c_{init}$ to values 360, 361, . . . , 389 of z, respectively;
   values 416, 417, . . . , 445 of $c_{init}$ to values 390, 391, . . . , 419 of z, respectively;
   values 448, 449, . . . , 477 of $c_{init}$ to values 420, 421, . . . , 449 of z, respectively;
   values 480, 481, . . . , 509 of $c_{init}$ to values 450, 451, . . . , 479 of z, respectively; and
   values 512, 513, . . . , 541 of $c_{init}$ to values 480, 481, . . . , 509 of z, respectively.

24. The method of claim 13:
   further comprising receiving the single parameter from a base station;
   wherein each possible initialization sequence corresponds to a possible cyclic shift hopping pattern;
   wherein the derived initialization sequence corresponds to a cyclic shift hopping pattern that the user equipment applies to a cyclic shift to generate the uplink reference signal;
   wherein the single parameter comprises 9 or 10 bits, and the initialization sequence comprises 31 bits;
   wherein the range of the single parameter spans between a minimum value of 0 and a maximum value no greater than 541;
   wherein when cyclic shift hopping is enabled for the user equipment the one or more processing circuits are configured to generate the uplink reference signal by determining a cyclic shift hopping pattern from the derived initialization sequence, applying the cyclic shift hopping pattern to a cyclic shift, and applying the resulting cyclic shift to a base sequence; and
   wherein the defined one-to-one mapping maps the possible initialization sequences $c_{init}$ to the single parameter z by mapping:
      values 0, 1, . . . , 29 of $c_{init}$ to values 0, 1, . . . , 29 of z, respectively;
      values 32, 33, . . . , 61 of $c_{init}$ to values 30, 31, . . . , 59 of z, respectively;
      values 64, 65, . . . , 93 of $c_{init}$ to values 60, 61, . . . , 89 of z, respectively;
      values 96, 97, . . . 125 of $c_{init}$ to values 90, 91, . . . , 119 of z, respectively;
      values 128, 129, . . . 157 of $c_{init}$ to values 120, 121, . . . , 149 of z, respectively;
      values 160, 161, . . . , 189 of $c_{init}$ to values 150, 151, . . . , 179 of z, respectively;
      values 192, 193, . . . , 221 of $c_{init}$ to values 180, 181, . . . , 209 of z, respectively;
      values 224, 225, . . . , 253 of $c_{init}$ to values 210, 211, . . . , 239 of z, respectively;
      values 256, 257, . . . , 285 of $c_{init}$ to values 240, 241, . . . , 269 of z, respectively;
      values 288, 289, . . . , 317 of $c_{init}$ to values 270, 271, . . . , 299 of z, respectively;
      values 320, 321, . . . , 349 of $c_{init}$ to values 300, 301, . . . , 329 of z, respectively;
      values 352, 353, . . . , 381 of $c_{init}$ to values 330, 331, . . . , 359 of z, respectively;
      values 384, 385, . . . , 413 of $c_{init}$ to values 360, 361, . . . , 389 of z, respectively;
      values 416, 417, . . . , 445 of $c_{init}$ to values 390, 391, . . . , 419 of z, respectively;
      values 448, 449, . . . , 477 of $c_{init}$ to values 420, 421, . . . , 449 of z, respectively;
      values 480, 481, . . . , 509 of $c_{init}$ to values 450, 451, . . . , 479 of z, respectively; and values 512, 513, ..., 541 of $c_{init}$ to values 480, 481, ..., 509 of z, respectively.

25. A non-transitory computer-readable storage medium, having stored thereon a computer program that, when executed by one or more processors of a user equipment, cause the user equipment to initialize a pseudo-random sequence generator on which to base generation of an uplink reference signal, the computer program causing the user equipment to:

derive one of the initialization sequences within a subset of possible initialization sequences for the pseudo-random sequence generator, according to one or more rules that define different initialization sequences in the subset as a function of a single parameter, by deriving the initialization sequence based on a defined one-to-one mapping of the possible initialization sequences in the subset to possible values for the single parameter, wherein the range of the single parameter is smaller than the range of the subset, wherein the one or more processing circuits are configured to derive the initialization sequence $c_{init}$ according to $$c_{init} = z + 2\lfloor \frac{z}{30} \rfloor,$$

wherein z is the single parameter and $\lfloor x \rfloor$ denotes a floor function that rounds x to the nearest integer less than or equal to x;

generate the uplink reference signal with the pseudo-random sequence generator initialized to the derived initialization sequence; and transmit the generated signal.

26. The computer-readable storage medium of claim 25, wherein each possible initialization sequence corresponds to a possible cyclic shift hopping pattern, and wherein the the derived initialization sequence corresponds to a cyclic shift hopping pattern that the user equipment applies to a cyclic shift to generate the uplink reference signal.

27. A base station configured to initialize a pseudo-random sequence generator on which a user equipment bases generation of an uplink reference signal, comprising a transceiver circuit and one or more processing circuits configured to:

determine a sequence from a subset of possible initialization sequences for said pseudo-random sequence generator;

encode the determined sequence as a single parameter, wherein different values for the single parameter represent different possible initialization sequences within the subset, wherein the determined sequence is encoded based on a defined one-to-one mapping of the possible initialization sequences within the subset to possible values for the single parameter, wherein the range of the single parameter is smaller than the range of the subset, wherein the determined sequence $c_{init}$ is encoded as the single parameter $$z = c_{init} - 2\lfloor \frac{c_{init}}{32} \rfloor,$$

wherein $\lfloor x \rfloor$ denotes a floor function that rounds x to the nearest integer less than or equal to x; and initialize said pseudo-random sequence generator of the user equipment with the determined sequence by transmitting the single parameter to the user equipment.

28. The base station of claim 27, wherein each possible initialization sequence corresponds to a possible cyclic shift hopping pattern, and wherein the determined sequence corresponds to a cyclic shift hopping pattern that the user equipment applies to a cyclic shift to generate the uplink reference signal.

* * * * *

UNITED STATES PATENT AND TRADEMARK OFFICE
CERTIFICATE OF CORRECTION

PATENT NO.  : 9,716,577 B2
APPLICATION NO. : 15/006569
DATED  : July 25, 2017
INVENTOR(S)  : Sorrentino et al.

It is certified that error appears in the above-identified patent and that said Letters Patent is hereby corrected as shown below:

On the Title Page

In Column 1, below "Related U.S. Application Data", Line 1, delete item "(60)" and insert item -- (63) --, therefor.

In the Specification

In Column 1, Line 9, delete "2014," and insert -- 2014, now Pat No. 9,253,005, --, therefor.

In Column 1, Line 11, delete "issued" and insert -- issued as --, therefor.

In Column 6, Line 38, delete "the a" and insert -- the --, therefor.

In Column 9, Lines 35-36, delete "second subset 30-2" and insert -- second subset 28-2 --, therefor.

In Column 13, Line 55, delete "third device 28-1." and insert -- third device 16-3. --, therefor.

In Column 13, Line 59, delete "second device 16-1" and insert -- second device 16-2 --, therefor.

In the Claims

In Column 17, Line 20, in Claim 11, delete "97, . . . 125" and insert -- 97, . . . , 125 --, therefor.

In Column 17, Line 22, in Claim 11, delete "129, . . . 157" and insert -- 129, . . . , 157 --, therefor.

In Column 18, Line 12, in Claim 12, delete "97, . . . 125" and insert -- 97, . . . , 125 --, therefor.

In Column 18, Line 14, in Claim 11, delete "129, . . . 157" and insert -- 129, . . . , 157 --, therefor.

In Column 19, Line 50, in Claim 23, delete "97, . . . 125" and insert -- 97, . . . , 125 --, therefor.

Signed and Sealed this
Twenty-ninth Day of May, 2018

Andrei Iancu
*Director of the United States Patent and Trademark Office*

CERTIFICATE OF CORRECTION (continued)
U.S. Pat. No. 9,716,577 B2

In Column 19, Line 52, in Claim 23, delete "129, . . . 157" and insert -- 129, . . . , 157 --, therefor.

In Column 20, Line 42, in Claim 24, delete "97, . . . 125" and insert -- 97, . . . , 125 --, therefor.

In Column 20, Line 44, in Claim 124, delete "129, . . . 157" and insert -- 129, . . . , 157 --, therefor.

In Column 21, Line 36, in Claim 26, delete "the the" and insert -- the --, therefor.